United States Patent
Yamada et al.

(10) Patent No.: US 8,081,200 B2
(45) Date of Patent: Dec. 20, 2011

(54) LASER EXPOSURE DEVICE, CLEANING TOOL, AND IMAGE FORMING APPARATUS

(75) Inventors: Yoshihisa Yamada, Nara (JP); Nobuhiro Shirai, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 415 days.

(21) Appl. No.: 12/334,691

(22) Filed: Dec. 15, 2008

(65) Prior Publication Data

US 2009/0162117 A1    Jun. 25, 2009

(30) Foreign Application Priority Data

Dec. 20, 2007    (JP) ................................. 2007-329093

(51) Int. Cl.
*B41J 2/385* (2006.01)
*G03G 15/20* (2006.01)

(52) U.S. Cl. ........ 347/136; 347/130; 347/131; 347/132; 347/133; 347/134; 347/135; 347/241

(58) Field of Classification Search .......... 347/111–170; 399/98–99, 123
See application file for complete search history.

(56) References Cited

U.S. PATENT DOCUMENTS

| | | | | |
|---|---|---|---|---|
| 5,752,133 A * | 5/1998 | Nagase et al. | ................ | 399/112 |
| 5,805,192 A * | 9/1998 | Sasaki et al. | ................ | 347/131 |
| 6,707,480 B2 * | 3/2004 | Ameyama et al. | ............ | 347/129 |
| 7,187,399 B2 * | 3/2007 | Noguchi et al. | ............ | 347/241 |
| 7,333,128 B2 * | 2/2008 | Yoon | ............................. | 347/241 |
| 7,352,377 B2 * | 4/2008 | Matsutomo | .................... | 347/136 |
| 7,391,425 B2 * | 6/2008 | Marsh et al. | .................. | 347/120 |
| 7,436,426 B2 * | 10/2008 | Lim | ............................. | 347/263 |
| 7,728,862 B2 * | 6/2010 | Kishimoto | .................... | 347/236 |
| 7,778,562 B2 * | 8/2010 | Kurose et al. | .................. | 399/51 |
| 2005/0243156 A1 * | 11/2005 | Matsutomo | .................... | 347/136 |
| 2006/0018670 A1 * | 1/2006 | Yoon | ................................ | 399/4 |
| 2007/0070173 A1 | 3/2007 | Yamakawa et al. | | |

FOREIGN PATENT DOCUMENTS

| | | |
|---|---|---|
| JP | 2000-242063 | 9/2000 |
| JP | 2004-029061 | 1/2004 |
| JP | 2005-329622 | 12/2005 |
| JP | 2007-086605 | 4/2007 |

* cited by examiner

*Primary Examiner* — Ryan Lepisto
*Assistant Examiner* — Guy Anderson
(74) *Attorney, Agent, or Firm* — Renner, Otto, Boisselle & Sklar, LLP

(57) ABSTRACT

Emission windows are prevented from being contaminated and are cleaned easily. The emission windows for emitting light beams are disposed on a housing of a laser exposure device having optical elements arranged inside for exposing a photoreceptor, and the upper surface of the housing is provided with a slidable shutter with openings. An image forming apparatus includes guide rails independent of the laser exposure device to movably guide predetermined cleaning brushes in the longitudinal direction of the emission windows. When the cleaning brushes are mounted on the guide rails and moved toward the inner side of the apparatus, the cleaning brushes touch a slant portion of a rib and the shutter is moved to the right to align the openings with the emission windows. While the cleaning brushes touch a longitudinally extending portion, the emission windows are exposed to enable the cleaning of the exposed window using the cleaning tool.

13 Claims, 8 Drawing Sheets

LASER EXPOSURE DEVICE, CLEANING TOOL, AND IMAGE FORMING APPARATUS

CROSS-NOTING PARAGRAPH

This Nonprovisional application claims priority under 35 U.S.C. §119(a) on Patent Application No. 2007-329093 filed in JAPAN on Dec. 20, 2007, the entire contents of which are hereby incorporated herein by references.

FIELD OF THE INVENTION

The present invention relates generally to a laser exposure device, a cleaning tool, and an image forming apparatus, and more particularly, to a laser exposure device applicable to electrophotographic image forming apparatuses such as digital copiers, printers, and facsimile machines, a cleaning tool for cleaning the laser exposure device, and an image forming apparatus having the laser exposure device.

BACKGROUND OF THE INVENTION

Image forming apparatuses such as digital copiers, laser printers, or facsimile machines are widely used. Such an image forming apparatus uses an image writing device that scans a laser beam to write an image on a photoreceptor. When an image forming apparatus forms an image, a charging device charges a photoreceptor and the image forming apparatus then performs writing in accordance with image information to form an electrostatic latent image on the photoreceptor. The electrostatic latent image on the photoreceptor is developed with toner supplied from a developing device. The toner image developed on the photoreceptor is transferred onto a recording paper sheet by a transferring device and is fixed on the recording paper sheet by a fixing device to acquire a desired image.

Along with speeding up of color image forming apparatuses such as digital copiers and laser printers, a tandem-mode apparatus is in practical use which includes a plurality of photoreceptors in tandem arrangement. In this case, for example, four photoreceptor drums are arranged in the carrying direction of the recording paper; the photoconductors are concurrently exposed to light by a scanning optical system corresponding to the photoconductor drums to form latent images; and these latent images are developed by developing devices that use developer with different colors such as yellow (Y), magenta (M), cyan (C), and black (K). The developed toner images are sequentially transferred and overlapped on the same recording paper sheet to acquire a color image.

Electrophotographic image forming apparatuses generally use developers such as toners and the toners drop and scatter within the image forming apparatuses. Therefore, a laser exposure device having optical components for exposing a photoconductor disposed within a housing is used to shield the optical components from the toners and other dusts.

Such a laser exposure device has optical components such as laser diodes and polygon mirrors disposed within the housing and YMCK light beams are emitted from the housing to expose a photoreceptor drum disposed outside the housing.

Therefore, the housing of the laser exposure device is provided with an emission window made of light-transmitting material for transmitting a laser beam emitted outside to close the housing even at the portion of the light emitting path for the laser beam.

However, since the emission window portion is exposed to the environment with dropping toner on the outside, it is problematic that the toner adheres to and contaminates the outer surface of the emission window, reduces the transmissivity of the light beam, and reduces quality of images to be formed.

With regard to such a problem, Japanese Laid-Open Patent Publication No. 2005-329622 discloses an apparatus provided with a shutter such that the emission window is not contaminated by toner, etc. A covering member is provided that is movable to a covering position for covering the light transmitting dust-proof member for closing the opening part formed in the optical housing, and to an opening position for opening the covering of the light transmitting dust-proof member. A cleaning member is fitted to the covering member and is brought into slidable contact with the outer peripheral face of the light transmitting dust-proof member when the covering member is moved. Before starting an image forming action and after finishing it, the covering member is moved, and the dust stuck on the outer peripheral face of the light transmitting dust-proof member is automatically cleaned by the cleaning member.

If the outer surface of the light-transmitting emission window disposed on the housing of the laser exposure device is contaminated, it is problematic that the transmissivity of the light beam is reduced and that the quality of images to be formed is reduced as described above. To solve this problem, an apparatus is desired that hinders toner from adhering to the outer surface of the emission window and enables immediate cleaning if the toner adheres. Because of the request for miniaturization of image forming apparatuses, the emission window must be prevented from being contaminated and the cleaning must be done without increasing the size of the apparatuses.

SUMMARY OF THE INVENTION

It is an object of the present invention to provide a laser exposure device that prevents an emission window from being contaminated and that enables easy cleaning of the emission window, a cleaning tool, and an image forming apparatus having the laser exposure device.

Another object of the present invention is to provide a laser exposure device which has a laser emitting portion that emits a laser beam, and exposes an external photoreceptor by scanning the laser light emitted by the laser emitting portion to write a latent image on the photoreceptor, wherein a housing that shields optical components of the laser exposure device from outside air and includes an emission window that transmits the laser beam emitted to the outside, and a shutter that opens and closes the emission window are provided, and the shutter includes an emission window opening/closing mechanism that comes in contact with a predetermined cleaning tool for cleaning the emission window to open/close the emission window depending on movement of the cleaning tool along the longitudinal direction of the emission window.

Another object of the present invention is to provide the laser exposure device, wherein the shutter has a plurality of openings, and the emission windows are opened and closed by achieving a state of exposing the emission windows through the openings and a state of covering the emission windows depending on the movement of the shutter.

Another object of the present invention is to provide the laser exposure device, wherein the emission window opening/closing mechanism is included as a rib protruded from the surface of the shutter and the rib has a longitudinally extending portion extended in the vicinity of the openings along the longitudinal direction of the emission windows and a slant portion linked to the longitudinally extending portion and extended in a direction slanted from the longitudinal direction of the openings.

Another object of the present invention is to provide a cleaning tool for cleaning the laser exposure device, which is provided with a protrusion being in contact with the rib on the leading end of the cleaning tool.

Another object of the present invention is to provide the cleaning tool, which is provided with a second protrusion on a side surface thereof.

Another object of the present invention is to provide the cleaning tool, which includes the protrusion on one end in the longitudinal direction thereof and is provided with a cleaning member for cleaning the emission window on the side surface situated nearer the center in the longitudinal direction thereof in relation to the protrusion.

Another object of the present invention is to provide an image forming apparatus which comprises the laser exposure device and a photoreceptor, forms an image by forming a latent image on the photoreceptor using the laser exposure device and developing the latent image.

Another object of the present invention is to provide the image forming apparatus, wherein a portion of a housing composing the image forming apparatus has a configuration to be opened and closed, and an interlocking mechanism is included that interlocks opening/closing of the portion of the housing that composes the image forming apparatus with opening/closing of the shutter.

Another object of the present invention is to provide an image forming apparatus having the laser exposure device, comprising a guide rail independently from the laser exposure device, the guide rail holding the cleaning member to movably guide the cleaning member along the longitudinal direction of the emission window, wherein when a predetermined cleaning tool is mounted on the guide rail and moved in the longitudinal direction of the emission window, the cleaning member comes in contact with the slant portion of the rib and moves the shutter to achieve a state of exposing the emission window in accordance with the movement of the cleaning tool, and when the cleaning tool changes from the state in contact with the slant portion to the state in contact with the longitudinally extending portion, the state of exposing the emission window is maintained to enable the cleaning tool to clean the exposed window.

PREFERRED EMBODIMENTS OF THE INVENTION

First Embodiment

Figure 1:
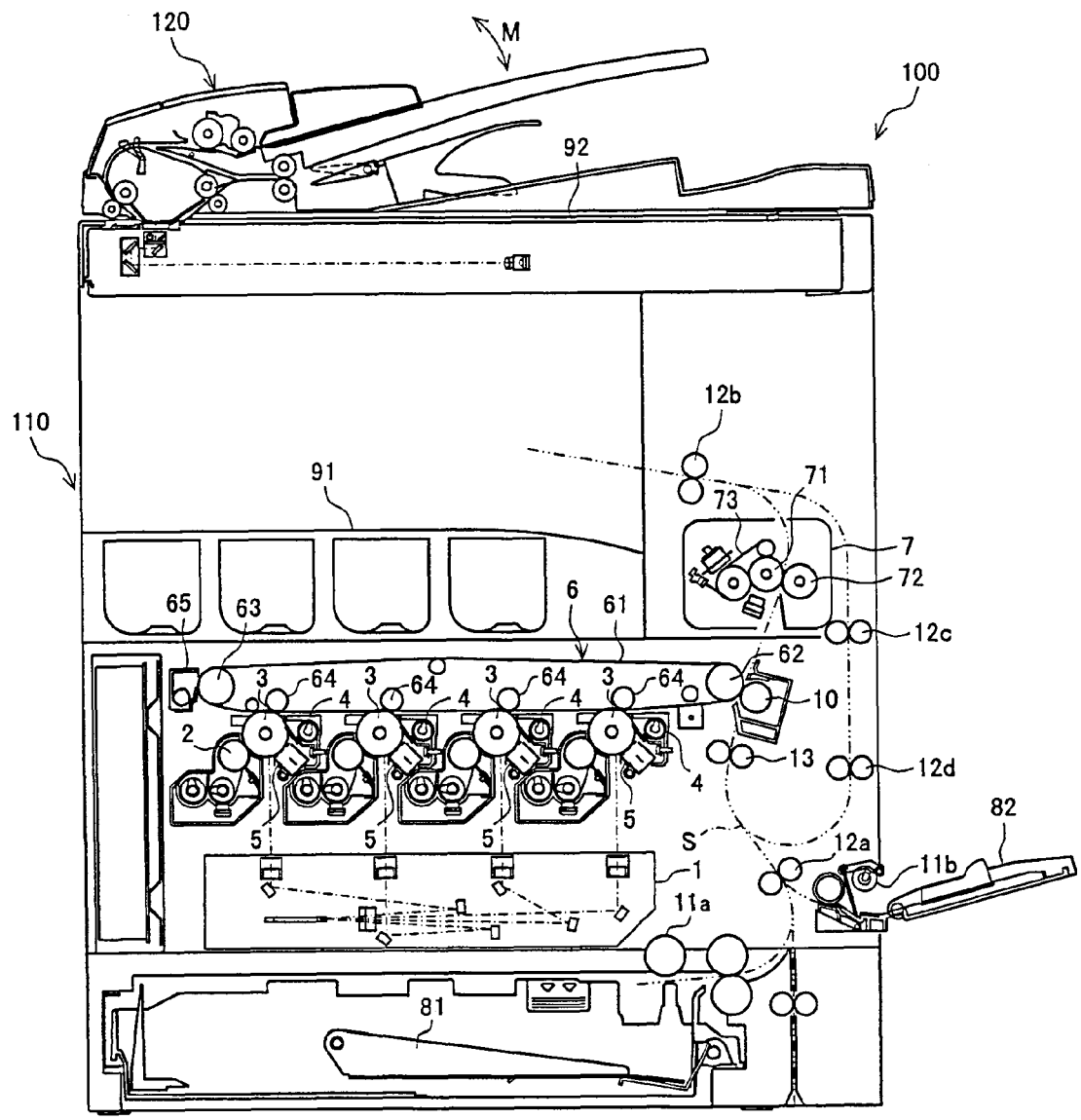
FIG. 1 depicts an exemplary configuration of an image forming apparatus having a laser exposure device according to the present invention.

FIG. 1 depicts an exemplary configuration of an image forming apparatus having a laser exposure device according to the present invention. An image forming apparatus 100 forms multicolor or monochrome images on predetermined sheets (recording paper) depending on image data transmitted from the outside and consists of an apparatus main body 110 and an automatic document processing device 120. The apparatus main body 110 includes an exposure unit 1, developing devices 2, photoreceptor drums 3, cleaner units 4, charging devices 5, an intermediate transfer belt unit 6, a fixing unit 7, a paper feed cassette 81, a paper discharge tray 91, etc.

On the upper part of the apparatus main body 110, a document platform 92 made of clear glass is disposed for placing a document, and the document processing apparatus 120 is mounted on the upper side of the document platform 92. The document processing apparatus 120 automatically feeds a document onto the document platform 92. The document processing apparatus 120 is formed to be rotatable in directions of an arrow M, and a document can be manually placed by opening the upper side of the document platform 92.

The image data handled in the image forming apparatus correspond to a color image using colors of black (K), cyan (C), magenta (M), and yellow (Y). Therefore, four sets of the development devices 2, the photoconductor drums 3, the charging devices 5, and the cleaner units 4 are provided such that four types of latent images are formed correspondingly to four colors and each set is set to black, cyan, magenta, or yellow to compose four image stations.

The charging device 5 is a charging means for uniformly charging the surface of the photoconductor drum 3 to a predetermined electric potential and, a contact roller or brush charging device may be used in addition to the charger type charging device shown in FIG. 1.

The exposure unit 1 corresponds to a laser exposure device according to the present invention and is composed as a laser scanning unit (LSU) including a laser emitting portion and a reflection mirror. The exposure unit 1 is provided with a polygon mirror that scans laser beams and optical components such as lenses and mirrors for guiding the light beams reflected by the polygon mirror to the photoreceptor drums. For example, an EL or LED writing head having light emitting elements arranged in an array may also be used as the exposure unit 1.

The exposure unit 1 has a function of forming an electrostatic latent image corresponding to an input image data on the surface of the charged photoreceptor drum 3 by exposing the drum 3 according to the input image data. The developing device 2 develops the electrostatic latent images formed on the respective photoreceptor drums 3 with toners of four colors (Y, M, C, and K). The cleaner units 4 remove and collect the toners remaining on the surface of the photoconductor drum 3 after the development and the image transfer.

The intermediate transfer belt unit 6 is disposed above the photoconductor drums 3 and includes an intermediate transfer belt 61, an intermediate transfer belt driving roller 62, an intermediate transfer belt driven roller 63, intermediate transfer rollers 64, and an intermediate transfer belt cleaning unit 65. Four intermediate transfer rollers 64 are provided according to four colors of Y, M, C, and K.

The intermediate transfer belt 61 is stretched and rotationally driven by the intermediate transfer belt driving roller 62, the intermediate transfer belt driven roller 63, and the intermediate transfer rollers 64. The intermediate transfer rollers 64 give a transfer bias for transferring the toner images on the photoconductor drums 3 onto the intermediate transfer belt 61.

The intermediate transfer belt 61 is provided to be in contact with the photoconductor drums 3. The intermediate transfer belt 61 has a function of forming a color toner image (multicolor toner image) on the intermediate transfer belt 61 by transferring and overlapping the color toner images formed on the photoconductor drums 3 onto the intermediate transfer belt 61 one after another. For example, the intermediate transfer belt 61 is made of a film with a thickness of about 100 μm to 150 μm in an endless shape.

The transfer of the toner images from the photoconductor drums 3 to the intermediate transfer belt 61 is performed through the intermediate transfer rollers 64 in contact with the back side of the intermediate transfer belt 61. To the intermediate transfer rollers 64, a high-voltage transfer bias (high voltage with the opposite polarity (+) to the charging polarity (−) of the toner) is applied to transfer the toner images. The intermediate transfer roller 64 is a roller having a metal (e.g., stainless steel) shaft with a diameter of 8 to 10 mm the surface of which is covered with a conductive elastic material (e.g., EPDM, urethane foam, etc.). The high voltage can uniformly be applied to the intermediate transfer belt 61 with this conductive elastic material. Although the roller shape is used for the transfer electrode in this embodiment, other shapes such as a brush shape may also be used.

The electrostatic images are developed on the photoconductor drums 3 in accordance with the hues as described above and is laminated on the intermediate transfer belt 61. The laminated image information is transferred due to the rotation of the intermediate transfer belt 61 onto a paper sheet by a transfer roller 10 disposed at a contact position between the paper sheet and the intermediate transfer belt 61.

The intermediate transfer belt 61 and the transfer roller 10 are pressed against each other with a predetermined nip and a voltage (voltage with the opposite polarity (+) to the charging polarity (−) of the toner) is applied to the transfer roller 10 to transfer the toner to the paper sheet. To constantly obtain the nip, either one of the transfer roller 10 or the intermediate transfer belt driving roller 62 is made of a hard material (e.g., metal) and the other is made of a soft material such as an elastic roller (e.g., elastic rubber roller or resin foam roller).

Since color mixture is caused by the toner adhering to the intermediate transfer belt 61 due to the contact with the photoconductor drum 3 or by the toner remaining on the intermediate transfer belt 61 that is not transferred onto the paper sheet by the transfer roller 10 as above, the toner is removed and collected by the intermediate transfer belt cleaning unit 65. The intermediate transfer belt cleaning unit 65 includes a cleaning member, for example, a cleaning blade, being in contact with the intermediate transfer belt 61 and the intermediate transfer belt 61 which the cleaning blade is in contact with the intermediate transfer belt driven roller 63 from the back side.

The paper feed cassette 81 is a tray for storing sheets (recording paper sheets) used for forming images and is provided on the underside of the exposure unit 1 in the apparatus main body 110. The sheets used for forming images may also be placed on a manual paper feed cassette 82. The paper discharge tray 91 provided on the upper side of the apparatus main body 110 is a tray for stacking the printed recording sheets face-down.

The apparatus main body 110 is provided with a paper carrying path S arranged in approximately vertical for sending the sheets in the paper feeding cassette 81 and the manual paper feed cassette 82 to the paper discharge tray 91 via the transfer roller 10 and the fixing unit 7. Pickup rollers 11a, 11b, a plurality of carrying rollers 12a to 12d, a resist roller 13, the transfer roller 10, the fixing unit 7, etc. are disposed near the paper carrying path S from the paper feeding cassette 81 or the manual paper feed cassette 82 to the paper discharge tray 91.

The carrying rollers 12a to 12d are small rollers for facilitating/aiding the carriage of the sheets and are provided along the paper carrying path S. The pickup roller 11a is provided near the end of the paper feeding cassette 81 and picks up the sheets one-by-one from the paper feeding cassette 81 to supply the sheets to the paper carrying path S. The pickup roller 11b is similarly provided near the end of the paper feeding cassette 82 and picks up the sheets one-by-one from the paper feeding cassette 82 to supply the sheets to the paper carrying path S.

The resist roller 13 temporarily holds the sheet carried through the paper carrying path S. The resist roller 13 has a function of carrying the sheet to the transfer roller 10 at the timing when the leading end of the toner image on the photoconductor drum 3 meets the leading end of the sheet.

The fixing unit 7 includes a heat roller 71 and a pressure roller 72, and the heat roller 71 and the pressure roller 72 are rotated with a sheet sandwiching between them. The heat roller 71 is set to be a predetermined fixing temperature by a controlling unit based on a signal from a temperature detector (not shown) and has a function to melt/mix/press the multicolor toner image transferred to the sheet and fix it on the sheet thermally by performing the thermocompression of the toner against the sheet along with the pressure roller 72. An external heating belt 73 is also provided to heat the heat roller 71 from the outside.

The sheet carrying path will then be described in detail. As described above, the image forming apparatus is provided with the paper feed cassette 81 in which the sheets are stacked in advance and the manual paper feed cassette 82. To feed sheets from these feeding cassettes 81 and 82, the pickup rollers 11a and 11b are disposed to guide the sheets one-by-one from respective cassettes to the carrying path S.

A sheet carried from the paper feeding cassette 81 and 82 is carried to the resist roller 13 by the carrying roller 12a on the paper carrying path S and is carried to the transfer roller 10 at the timing when the leading end of the sheet meets the leading end of the image information on the intermediate transfer belt 61, and the image information is written onto the sheet. Subsequently, when the sheet passes through the fixing unit 7, the unfixed toner on the sheet is thermally melted/fixed and the sheet is discharged on the paper discharge tray 91 via the carrying roller 12b disposed behind the unit 7.

Although the above carrying path is used when one-side printing is requested for a sheet, when two-side printing is requested, after the one-side printing is completed as described above and the rear end of the sheet passing through the fixing unit 7 is gripped by the final carrying roller 12b, the carrying roller 12b is reversely rotated to guide the sheet to the carrying rollers 12c and 12d. Subsequently, after the sheet passes through the resist roller 13 and the printing is performed on the back side of the sheet, the sheet is discharged on the paper discharge tray 91.

The configuration of the exposure unit 1 of the embodiment will then more specifically be described. The exposure unit 1 is applicable to a tandem-mode image forming apparatus as described above that forms a color image by concurrently scanning and exposing a plurality of the photoconductor drums 3 using a plurality of light beams to write images corresponding to colors different from each other onto the respective photoreceptor drums 3 and by putting the images corresponding to respective colors on the same transfer medium one after another.

The image forming apparatus is provided with the photoconductor drums for forming a K image, forming a C image, forming an M mage, and forming a Y image at approximately regular intervals. Since the respective images are concurrently formed, the tandem-mode image forming apparatus may considerably reduce the time required for forming a color image.

The exposure unit 1 for exposing the photoconductor drums 3 consists of a primary optical system (incoming optical system) and a secondary optical system (outgoing optical system), which are respectively unitized. The primary optical system includes four semiconductor lasers emitting Y, M, C, and K laser beams and optical elements such as mirrors and lenses guiding the laser beams to the polygon mirror (rotational polygon mirror) of the secondary optical system. The secondary optical system includes the polygon mirror that scans the laser beams on the photoreceptor drums, i.e., scanned objects, optical elements such as lenses and mirrors guiding the laser beams reflected by the polygon mirror to the photoreceptor drums, a BD sensor that detects the laser beams, etc. The polygon mirror has a configuration to be shared by the respective colors.

Figure 2:
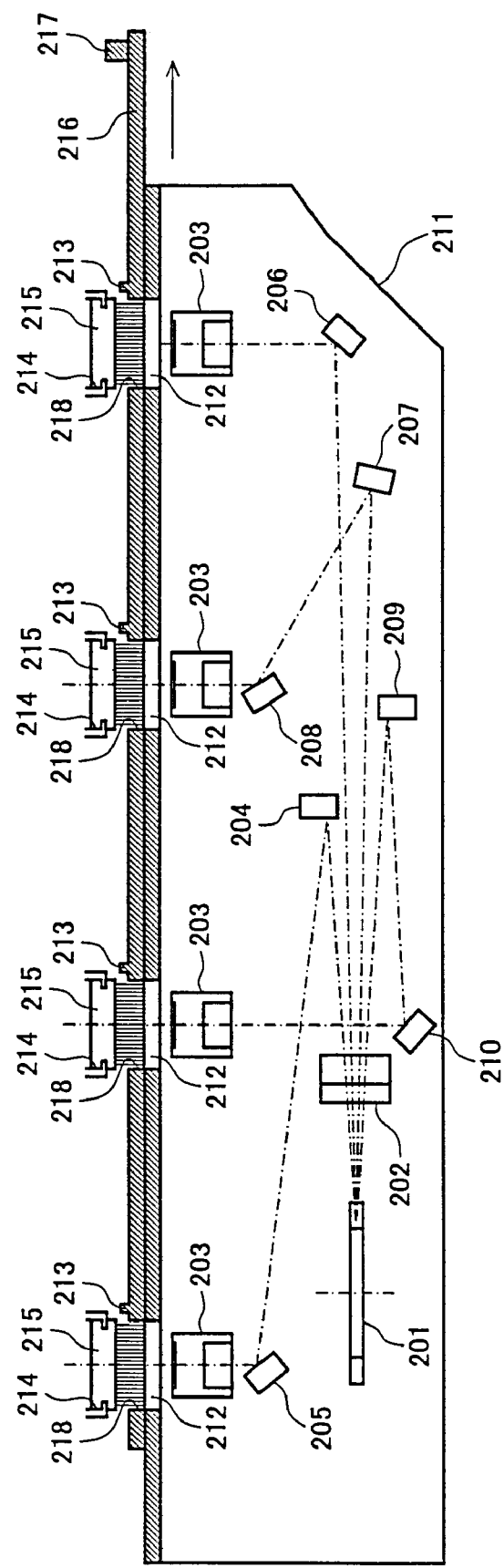
FIG. 2 depicts an exemplary configuration of a secondary optical system of the laser exposure device.
Figure 3:
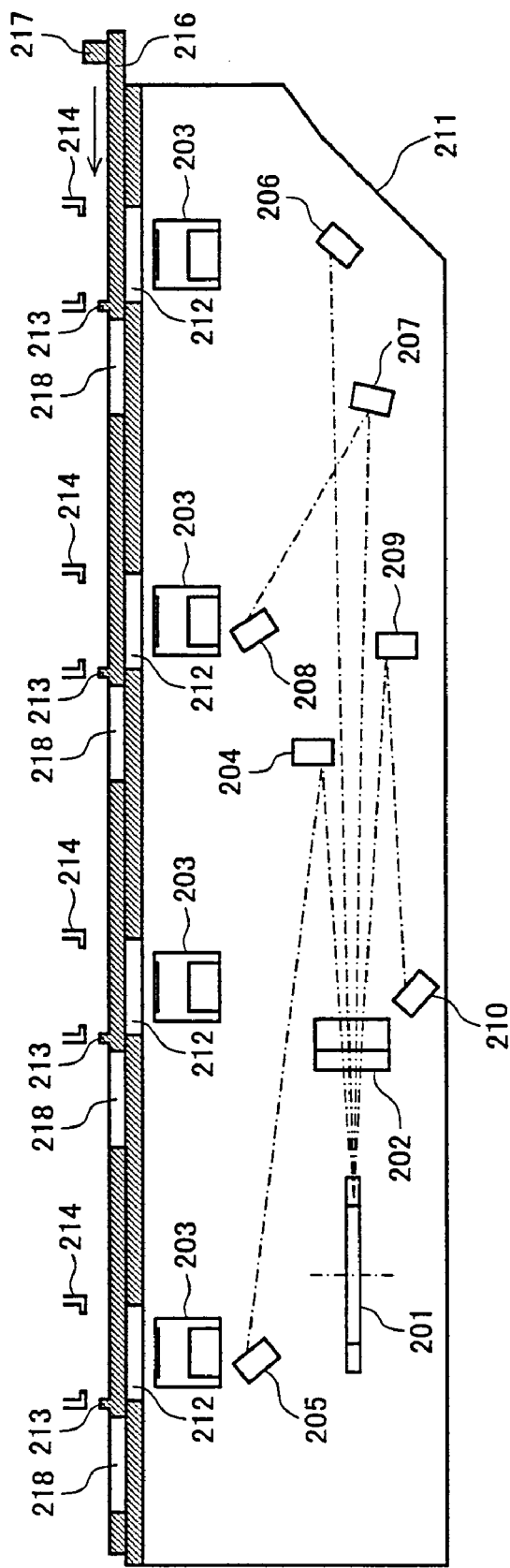
FIG. 3 depicts another exemplary configuration of the secondary optical system of the laser exposure device.

FIGS. 2 and 3 are views of exemplary configurations of the secondary optical system of the laser exposure device and schematically depict the inside of the housing when taking a side view of the exposure unit of the secondary optical system. FIG. 2 depicts an exposure state (exposure position) when laser beams are emitted through the emission windows from the inside of the unit to the photoreceptor drums (i.e., at the time of printing), and FIG. 3 depicts a standby state (standby position) with the emission windows blocked in the light paths of the laser beams.

In FIGS. 2 and 3, a reference numeral 201 denotes a polygon mirror; 202 denotes a fθ lens; 203 denotes a cylindrical lens; 204 denotes a first Y-mirror; 205 denotes a second Y-mirror; 206 denotes a K-mirror; 207 denotes a first C-mirror; 208 denotes a second C-mirror; 209 denotes a first M-mirror; 210 denotes a second M-mirror; 211 denotes a housing of the laser exposure unit; 212 denotes an emission window; 213 denotes a shutter rib; a 214 denotes a guide rail; 215 denotes a cleaning brush; 216 denotes a shutter; 217 denotes a protrusion; and 218 denotes an opening provided in the shutter.

The polygon mirror 201 has a plurality of (e.g., seven) reflection surfaces in the rotation direction and is rotationally driven by a polygon motor (not shown). The polygon motor is disposed in a concave portion on the back side of the housing 211 with the polygon mirror 201 disposed and a cover is provided for sealing the concave portion. The light beams of respective colors emitted from the laser diode of the primary optical system and reflected by an optical system such as mirrors may be reflected by the reflection surfaces of the polygon mirror 201 of the secondary optical system and may be transmitted through the emission windows 212 made of light-transmitting material to scan the photoreceptor drums 3 via subsequent optical elements such as mirrors. A plurality of the emission windows 212 is provided on the upper wall of the housing 211 in conformity with the light paths of the light beams.

A shutter 216 for opening/closing the emission windows 212 is provided on the upper side of the housing 211 having the emission windows 212. The shutter 216 includes openings 218 disposed at the position corresponding to that of the emission windows 212. The shutter 216 is slidably attached to the housing 211 to position the openings 218 of the shutter 216 in the light paths of the light beams to expose each of the photoreceptor drums 3 at the time of exposure of the photoreceptor drums 3 and to position the openings 218 at the standby position out of the light paths of the light beams to cover the outer surfaces of the emission windows 212 at the time of standby when the exposure is not performed. Therefore, the emission windows 212 may be prevented from being contaminated by the dropping toner, etc., at the time of standby when no image is formed.

At the exposure position, the light beams emitted from the cylindrical lens 203 within the housing may be emitted through the emission windows 212 and the openings 218 of the shutter to the photoreceptor drums 3 on the outside. The cleaning operation for the emission windows 212 is enabled at the exposure position by an operator externally inserting the cleaning brush. Although FIG. 2 depicts a state where the cleaning brushes 215 for cleaning the emission windows 212 is attached, the photoreceptor drums 3 are exposed without the cleaning brushes 215 in the normal exposure state. The movement mechanism of the shutter 216 and the mechanism to enable the cleaning of the emission windows with the cleaning brushes will be described later.

The K, C, M, and Y laser beams emitted from the laser diode of the first optical system (not shown) are incident upon the polygon mirror 201 with angle differences in the sub-scanning direction. These laser beams are separated after passing through a scanning optical system composed of the fθ lens 202 with the angle differences maintained. The fθ lens 202 has lens power in the main scanning direction. Therefore, the light beams of parallel light emitted from the polygon mirror 201 are converged to have a predetermined beam diameter on the surfaces of the photoreceptor drums 3 in the main scanning direction. The fθ lens 202 has a function of converting a laser beam moving at a uniform angular velocity in the main scanning direction due to the uniform angular velocity movement of the polygon mirror 201 into a laser beam moving at a uniform linear velocity on the scanning line on the photoreceptor drum 3.

The laser beam for Y (Y-beam) of the four laser beams for colors of KCMY separated by the polygon mirror 201 and passing through the fθ lens 202, is sequentially reflected by the first Y-mirror 204 and the second Y-mirror 205, and passes through the emission window 212 on the upper part of the housing 211 after passing through the cylindrical lens 203 for Y. If the shutter 216 is located at the exposure position, the laser beam transmitted through the emission window 212 passes through the opening 218 of the shutter 216 and reaches the photoreceptor drum 3 for Y. An image forming is performed in the scanning area on the photoreceptor drum 3.

After passing through the fθ lens 202, the separated laser beam for M (M-beam) is sequentially reflected by the first M-mirror 209 and the second M-mirror 210, goes through the cylindrical lens 203 for M, passes through the emission window 212 for M, passes through the opening 218 of the shutter 216, and reaches the photoreceptor drum 3 for M.

Similarly, after passing through the fθ lens 202, the separated laser beam for C (C-beam) is sequentially reflected by the first C-mirror 207 and the second C-mirror 208, goes through the cylindrical lens 203 for C, passes through the emission window 212 for C, passes through the opening 218 of the shutter 216, and reaches the photoreceptor drum 3 for C. After passing through the fθ lens 202, the laser beam for K (K-beam) is sequentially reflected by the K-mirror 206, goes through the cylindrical lens 203 for K, passes through the emission window 212 for K, passes through the opening 218 of the shutter 216, and reaches the photoreceptor drum 3 for K.

The laser beams of respective colors emitted from the cylindrical lenses 203 expose the charged photoreceptor drums 3 depending on image data. Therefore, electrostatic latent images are formed on the surface of the photoreceptor drums 3 depending on the image data. The developer uses KCMY toners to develop the electrostatic latent images formed on the respective photoreceptor drums 3.

The housing 211 shields the optical components disposed therein from outside air. The shutter 216 is slidably attached to the upper wall of the housing 211. The slide movement direction of the shutter 216 is identical to the arrangement direction of the photoreceptor drums 3 in this example. The shutter 216 includes the openings 218 disposed at the position corresponding to that of the emission windows 212 which transmits the light beams for exposing the photoreceptor drums 3. The tandem exposure unit 1 of this configuration includes the four emission windows 212 and the four openings 218.

The four openings 218 provided corresponding to the light paths of the YMCK light beams are concurrently moved to achieve the exposure state for the photoreceptor drums 3 shown in FIG. 2 and the standby state shown in FIG. 3 in accordance with the slide movement of the shutter 216.

In the exposure state shown in FIG. 2, the openings 218 of the shutter 216 are located on the upper parts of the emission windows 212 provided on the light paths of the YMCK light beams heading for the photoreceptor drums 3 from the inside of the housing 211 so that the light beams transmitted through the emission windows 212 may pass through the openings 218.

In the standby state shown in FIG. 3, the openings 218 of the shutter 216 are located out of the light paths of the light beams and the outer surfaces of the emission windows are shielded by the wall of the shutter 216. When the shutter 216 is in the standby state, since the emission windows 212 are shielded, the emission windows 212 may be prevented from being contaminated even if the toner drops from the photoreceptor drums 3.

In the exposure state shown in FIG. 2, the openings 218 of the shutter 216 are located on the upper parts of the emission windows 212 and the outer surfaces of the emission windows 212 is cleaned since the emission windows 212 are exposed in this state. The guide rails 214 are provided to hold the cleaning brushes 215 for cleaning the emission windows 212. A plurality of (in this case, four) guide rails 214 is provided depending on the number of the emission windows 212. The predetermined shaped cleaning brushes 215 inserted by an operator, etc., from outside are mounted on the respective guide rails 214, and the emission windows 212 may be cleaned by moving the cleaning brushes 215 along the guide rails 214.

The guide rails 214 are attached to a main body frame (not shown) of the image forming apparatus and are fixed independently of the exposure unit 1. Therefore, if the shutter 216 attached to the housing 211 of the exposure unit 1 makes the slide movement, the positions of the guide rails 214 are not shifted. The guide rails 214 are disposed such that the cleaning brushes come into contact with the emission windows 212 when holding the predetermined shaped cleaning brushes 215. When the cleaning brushes 215 are moved along the guide rails 214, the brush portions of the cleaning brushes 215 slides on the outer surface of the emission windows 212 and the emission windows 212 may be cleaned.

Each of the emission windows 212 has a shape elongated in the main scanning direction (perpendicularly to the planes of FIGS. 2 and 3) in accordance with the light beam scanned in the main scanning direction of the exposure unit 1. Therefore, the guide rails 214 holding and guiding the cleaning brushes 215 also have a shape elongated in the main scanning direction so as to clean the emission windows 212 elongated in the main scanning direction. The guide rails 214 are located at the positions not interrupting the light paths of the light beams for exposing the photoreceptor drums 3.

The image forming apparatus is provided with an interlocking mechanism that interlocks the slide movement of the shutter 216 with opening/closing of a front door provided on the housing. The protrusion 217 provided on the shutter 216 is used for the interlocking mechanism. The interlocking mechanism will hereinafter be described.

Figure 4:
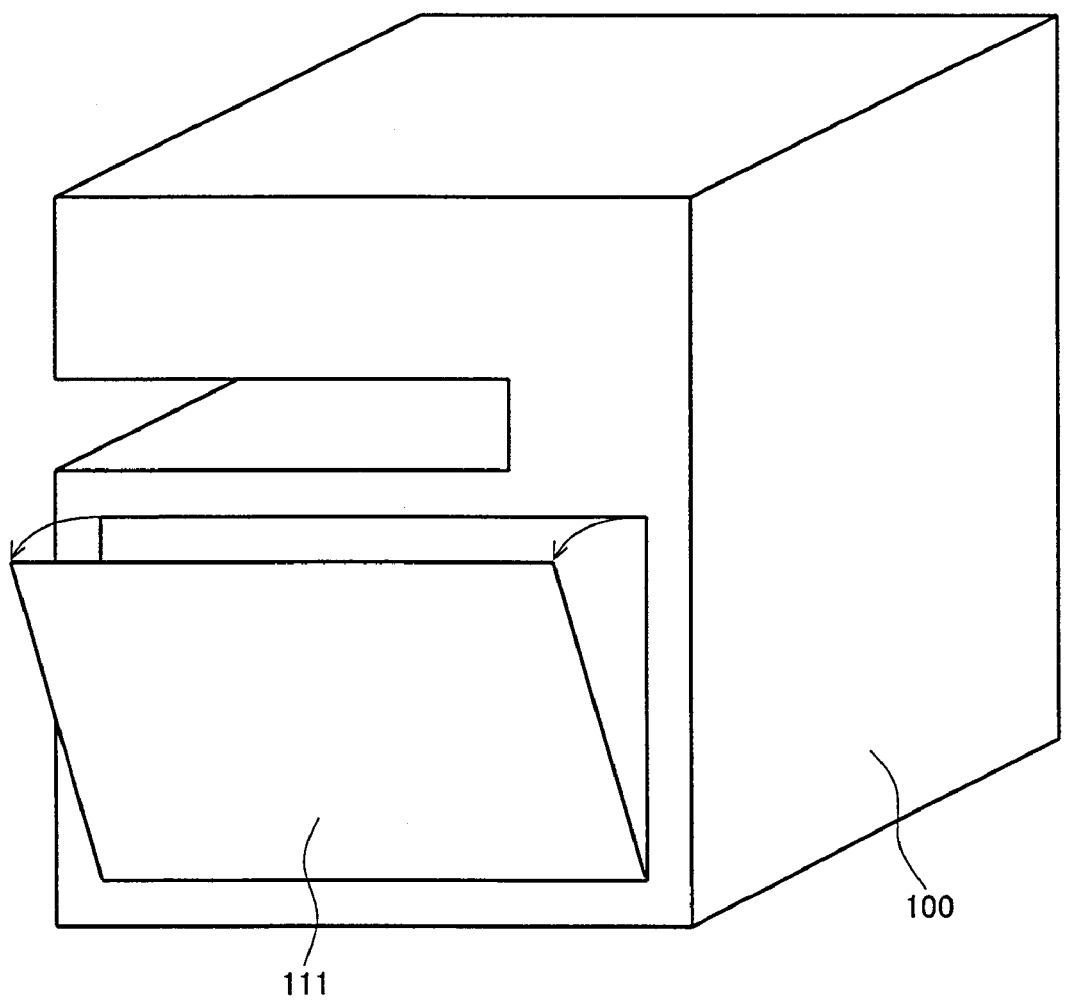
FIG. 4 is another view of an exemplary configuration of the image forming apparatus having the laser exposure device according to the present invention.

FIG. 4 is another view of an exemplary configuration of the image forming apparatus having the laser exposure device according to the present invention and schematically depicts an exterior appearance of the image forming apparatus. In FIG. 4, a reference numeral 111 denotes a front door.

The image forming apparatus 100 is provided with the front door 111 for opening/closing a portion of the housing. The developing devices 2, the photoreceptor drums 3, etc., disposed within the apparatus may be detached/attached and replaced by opening the front door 111. An operator, etc., may open the front door 111 and insert the cleaning brushes 215 to clean the emission windows 212.

The front door 111 is opened when replacing the developing devices 2, the photoreceptor drums 3, etc. To prevent the emission windows 212 from being contaminated by the toners dropped at the time of replacement of the developing devices 2 or the photoreceptor drums 3, the interlocking mechanism is provided to interlock the front door 111 with the shutter 216 to cause the slide movement such that the shutter 216 may be moved to the standby position when the front door is opened.

When the front door 111 is opened and the shutter 216 is located at the standby position, an operator, etc., inserts the predetermined shaped cleaning brushes 215 into the inside, mounts the cleaning brushes 215 on the guide rails 214 shown in FIGS. 2 and 3, and pushes the cleaning brushes 215 into the inner side of the apparatus along the guide rails 214 and thereby, the shutter 216 at the standby position may be displaced to the right and moved to the exposure position where the upper surfaces of the emission windows 212 are opened. The specific mechanism will be described later.

Figure 5A:
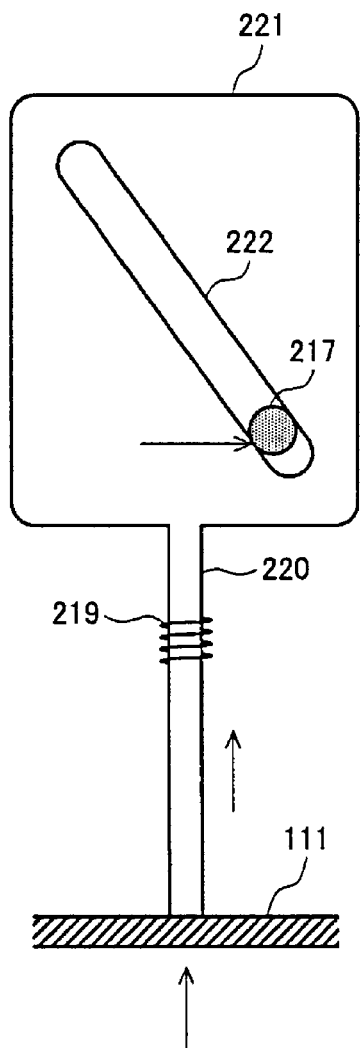
FIGS. 5A and 5B are specific explanatory schematic views of a configuration of an interlocking mechanism sliding a shutter shown in FIGS. 2 and 3.
Figure 5B:
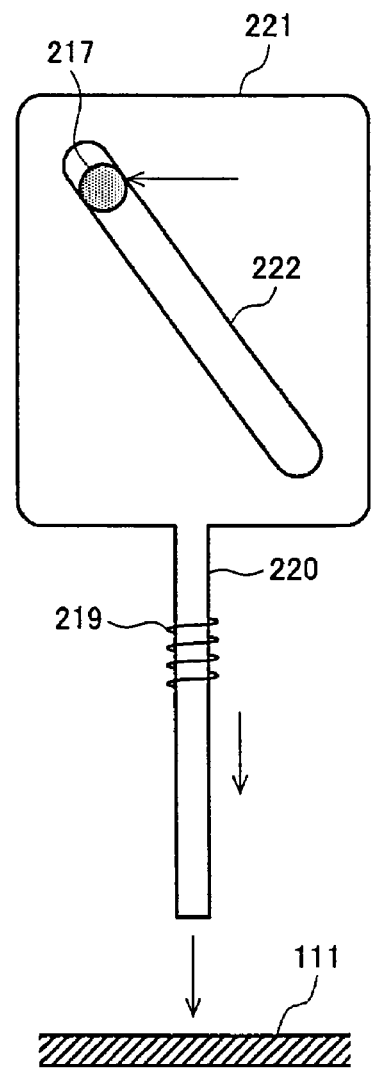

FIGS. 5A and 5B are specific explanatory schematic views of the configuration of the interlocking mechanism for sliding the shutter shown in FIGS. 2 and 3 and depict a moving plate disposed within the image forming apparatus viewed from above. FIG. 5A is an explanatory view of the state when the shutter is maintained at the exposure position, and FIG. 5B is an explanatory view of the state when the shutter is moved to the standby position. In FIGS. 5A and 5B, a reference numeral 219 denotes a spring; 220 denotes a lever; 221 denotes a moving plate; and 222 denotes a guide groove.

The protrusion 217 is provided on the upper right end of the shutter 216. The image forming apparatus includes the moving plate 221 having the guide groove 222 engaged with the protrusion 217 of the shutter 216. The moving plate 221 is attached and movable within the image forming apparatus 100. The moving direction of the moving plate 221 is a direction orthogonal to the slide movement direction of the shutter 216 shown in FIGS. 2 and 3.

The front side of the moving plate 221 is coupled to the lever 220. The front end of the lever 220 is located inside the front door 111 and is in contact with the inner wall of the front door 111 and maintained at a position displaced toward the inner side of the apparatus as shown in FIG. 5 when the front door 111 is closed. The guide groove 222 of the moving plate 221 is disposed diagonally to the movement direction of the moving plate 221 and the protrusion 217 is displaced to the right due to the influence of the guide groove 222. Therefore, the shutter 216 is also displaced to the right and maintained at the exposure position of FIG. 2.

In the normal state while the front door 111 is closed, the openings provided in the shutter 216 are located on the upper parts of the emission windows 212 provided on the light paths of the light beams for exposing the photoreceptor drums 3 to enable the exposure (i.e., printing) of the photoreceptor drums 3 by the exposure unit 1. In this state, the cleaning brushes 215 shown in FIG. 2 are not mounted on the guide rails 214.

If the front door 111 is opened, the pressure on the lever 220 shown in FIG. 5A is release. The spring 219 is attached to the lever 220, which is urged such that the moving plate 221 is displaced forward. Therefore, if the front door 111 is opened and the pressing force of the inner wall to the lever 200 is released, the moving plate 221 is displaced forward by the urging force of the spring 219. Therefore, the protrusion engaged with the guide groove 222 is moved to the left and the shutter 216 is also moved to the left and put into the standby state shown in FIG. 3. The emission windows 212 are shielded by the wall of the shutter 216 in this position. The emission windows 212 may be prevented from being contaminated due to the toner dropped when replacing the developing devices 2 or the photoreceptor drums 3 in this state.

Figure 6:
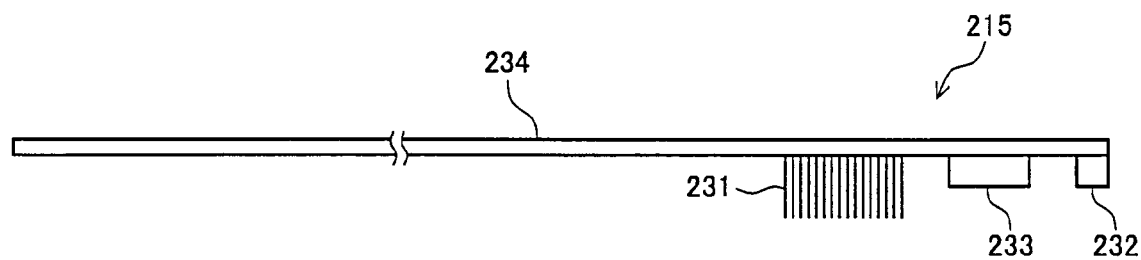
FIG. 6 depicts an exemplary configuration of a cleaning brush used for cleaning an emission window.

FIG. 6 depicts an exemplary configuration of the cleaning brush used for cleaning the emission window, and in FIG. 6, a reference numeral 231 denotes a brush portion; 232 denotes a first protrusion; 233 denotes a second protrusion; and 234 denotes a rod. The cleaning brush 215 corresponds to a cleaning tool of the present invention and the brush portion 231 corresponds to a cleaning member.

The cleaning brush 215 of the present invention may be held at one end of the long rod 234 by an operator, and the first protrusion 232 is protruded from the edge of the other end of the rod 234. The second protrusion 233 is protruded from a position in front of the first protrusion 232, i.e., closer to the center of the cleaning brush 215 in the longitudinal direction, and the brush portion 231 is disposed in front of the second protrusion 233. The first and second protrusions 232 and 233 are protruded downward from the rod 234. The second protrusion 233 is provided closer to a side of the rod 234.

The rod 234 of the cleaning brush 215 is engaged with the guide rail 214 shown in FIGS. 2 and 3 and is movably held along the guide rail 214. The brush portion 231 of the cleaning brush 215 is brought into contact with the emission window 212 by moving the cleaning brush 215 mounted on the guide rail 214 toward the inner side of the apparatus and slides on the emission window 212 in accordance with the movement of the cleaning brush 215 along the guide rail 214.

Figure 7:
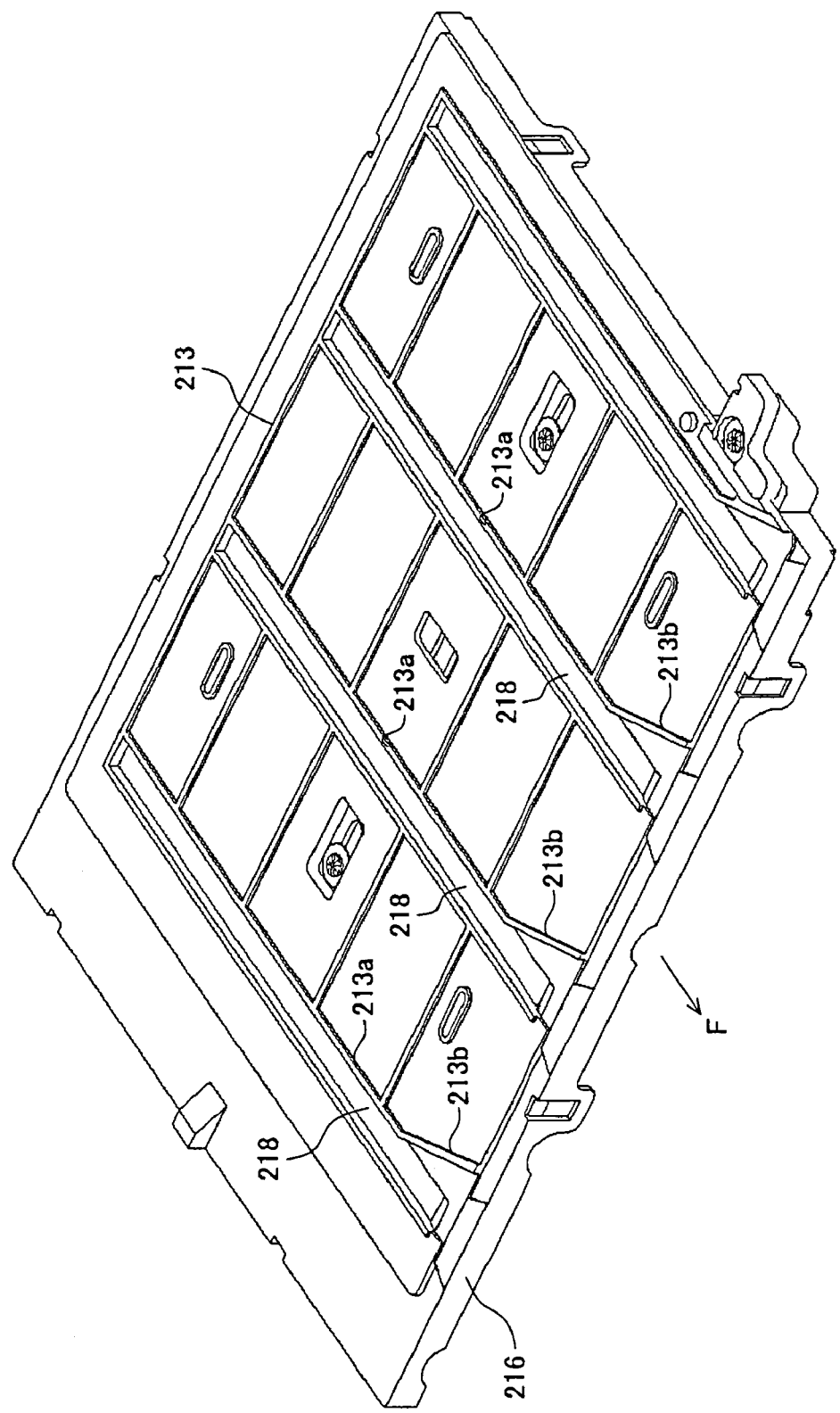
FIG. 7 is an explanatory view of a configuration of an emission window opening/closing mechanism for moving the shutter depending on the movement of the cleaning brush to open/close the emission window.

FIG. 7 is an explanatory view of a configuration of an emission window opening/closing mechanism for moving the shutter depending on the movement of the cleaning brush to open/close the emission window.

The shutter 216 is provided with a plurality of the openings 218. These openings 218 are formed in an elongated shape allowing the passage of the scan light scanning the photoreceptor drums 3. The shutter rib 213 is protruded from the upper portion of the surface of the shutter 216. The shutter rib 213 has a longitudinally extending portion 213a extended in the vicinity of the openings 218 along the longitudinal direction of the openings 218. The longitudinally extending portion 213a is coupled to a slant portion 213b extended in a direction slanted from the longitudinal direction of the openings 218 toward the front side (side of an arrow F) of the apparatus. The front side of the apparatus is identical to the side provided with the front door 111 of FIG. 4. The slant portion 213b and the longitudinally extending portion 213a move the position of the shutter 216 depending on the mounting/movement of the cleaning brushes 215 on the guide rails 214.

Figure 8A:
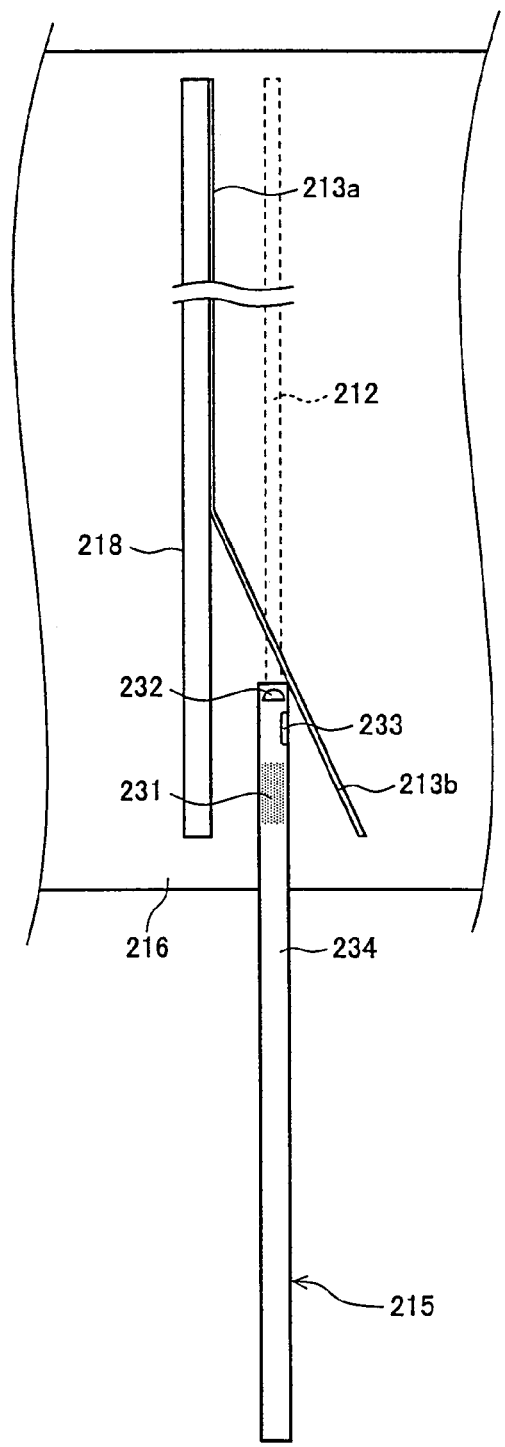
FIGS. 8A and 8B are explanatory views of the operation when the cleaning brush for cleaning the emission window is mounted on a guide rail to clean the emission window.
Figure 8B:
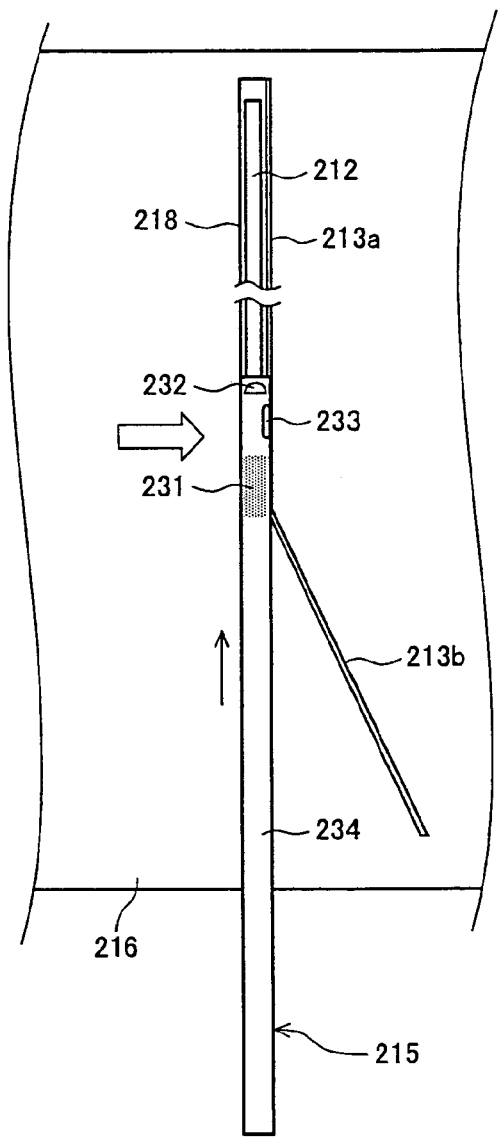

FIGS. 8A and 8B are explanatory views of the operation when the cleaning brush for cleaning the emission window is mounted on the guide rail to clean the emission window; FIG. 8A is an explanatory view of the state of mounting the cleaning brush 215 on the guide rail 214 in the standby state while the positions are out of alignment between the emission window 212 and the opening 218 of the shutter; and FIG. 8B is a view of the state of pushing the cleaning brush 215 toward the inner side of the apparatus along the guide rail 214. FIGS. 8A and 8B depict arrangement of the elements when the exposure unit 1 is viewed from above. The guide rail movably holding the cleaning brush 215 is not shown in FIGS. 8A and 8B.

If the front door 111 of the image forming apparatus is opened, the shutter 216 slides and moves in conjunction with the opening action and the shutter 216 is displaced to the standby position for shielding the emission windows 212 as above. While the front door 111 is opened, the cleaning brush 215 may be inserted into the housing of the image forming apparatus. The cleaning brush 215 is inserted by an operator, etc. The state shown in FIG. 8A is an initial state when an operator inserts the cleaning brush 215 and the cleaning brush 215 is attached to the guide rail 214.

In the state shown in FIG. 8A, the emission window 212 and the opening 218 of the shutter are out of alignment with each other when viewed from above, and the upper surface of the emission window 212 is covered by the wall of shutter 216. When the operator pushes the cleaning brush 215 attached to the guide rail 214 toward the inner side of the apparatus along the guide rail 214, the first protrusion 232 provided on the edge of the cleaning brush 215 comes into contact with the slant portion 213b of the shutter rib. When the cleaning brush 215 is continuously pushed along the guide rail 214, the shutter 216 is displaced to the right as a whole while the first protrusion 232 of the cleaning brush 215 slides on the slant portion 213b. The slide movement of the shutter 216 to the right is performed against the urging force of the spring 219 shown in FIGS. 5A and 5B. The state shown in FIG. 8B is the state when the first protrusion 232 passes the linking part between the slant portion 213b and the longitudinally extending portion 213a.

The emission window 212 and the opening 218 of the shutter 216 are aligned at the position shown in FIG. 8B and the emission window 212 is exposed through the opening 218. The brush portion 231 included in the cleaning brush 215 comes into contact with the upper surface of the emission window 212. Both the first protrusion 232 and the second protrusion 233 of the cleaning brush 215 are in contact with the longitudinally extending portion 213a of the shutter rib at this position. Since the state of exposing the emission window 212 through the opening 218 is maintained in the range of making contact between the first and second protrusions 232, 233 and the longitudinally extending portion 213a of the shutter rib, the emission window 212 may be cleaned with the brush portion 231 sliding on the emission window 212 by moving the cleaning brush 215 along the guide rail 214.

When the shutter 216 is moved against the urging force of the spring 219 and this state is maintained to clean the emission window 212, both the first protrusion 232 and the second protrusion 233 are in contact with the longitudinally extending portion 213a of the shutter rib. This is because the second protrusion 233 is separately provided in addition to the first protrusion 232 so as to prevent the dust due to abrasion of the protrusion from dropping onto the emission window 212. In the state of exposing the emission window 212, since the protrusions 232 and 233 make contact with a wider area of the longitudinally extending portion 213a of the shutter rib, the abrasion of the protrusions 232 and 233 may be constrained to prevent the dust due to abrasion from dropping onto the emission window 212.

Since the brush portion 231 is provided on the back of the protrusions 232 and 233 (closer to the center of the cleaning brush in the longitudinal direction) in the movement direction of the cleaning brush 215, the brush portion 231 may move after the first protrusion 232 moves the shutter 216 and the emission window 212 is exposed, and thereby the emission window 212 may be cleaned.

According to the present invention, the following effect may be acquired.

The present invention may provide a laser exposure device that is composed so as to prevent contamination of the emission windows and be able to clean the emission windows easily and an image forming apparatus having the laser exposure device.

The invention claimed is:

1. A laser exposure device which has a laser emitting portion that emits a laser beam, and exposes an external photoreceptor by scanning the laser light emitted by the laser emitting portion to write a latent image on the photoreceptor, comprising a housing that shields optical components of the laser exposure device from outside air and includes an emission window that transmits the laser beam emitted to the outside, and a shutter that opens and closes the emission window, wherein the shutter includes an emission window opening/closing mechanism which, when contacted with a predetermined cleaning tool for cleaning the emission window, opens/closes the emission window depending on movement of the cleaning tool along the longitudinal direction of the emission window.

2. The laser exposure device as defined in claim 1, wherein the shutter has a plurality of openings, and
the emission windows are opened and closed by achieving a state of exposing the emission windows through the openings and a state of covering the emission windows depending on the movement of the shutter.

3. The laser exposure device as defined in claim 2, wherein the emission window opening/closing mechanism is included as a rib protruded from the surface of the shutter and the rib has a longitudinally extending portion extended in the vicinity of the openings along the longitudinal direction of the emission windows and a slant portion linked to the longitudinally extending portion and extended in a direction slanted from the longitudinal direction of the openings.

4. A cleaning tool for cleaning the laser exposure device as defined in claim 1, which is provided with a protrusion being in contact with the rib on the leading end of the cleaning tool.

5. The cleaning tool as defined in claim 4, which is provided with a second protrusion on a side surface thereof.

6. The cleaning tool as defined in claim 4, which includes the protrusion on one end in the longitudinal direction thereof and is provided with a cleaning member for cleaning the emission window on the side surface situated nearer the center in the longitudinal direction thereof in relation to the protrusion.

7. An image forming apparatus which comprises the laser exposure device as defined in claim 1 and a photoreceptor, forms an image by forming a latent image on the photoreceptor using the laser exposure device and developing the latent image.

8. The image forming apparatus as defined in claim 7, wherein a portion of a housing composing the image forming apparatus has a configuration to be opened and closed, and an interlocking mechanism is included that interlocks opening/closing of the portion of the housing that composes the image forming apparatus with opening/closing of the shutter.

9. An image forming apparatus having the laser exposure device as defined in claim 3, comprising a guide rail independently from the laser exposure device, the guide rail holding the cleaning member to movably guide the cleaning member along the longitudinal direction of the emission window, wherein
when a predetermined cleaning tool is mounted on the guide rail and moved in the longitudinal direction of the emission window, the cleaning member comes in contact with the slant portion of the rib and moves the shutter to achieve a state of exposing the emission window in accordance with the movement of the cleaning tool, and when the cleaning tool changes from the state in contact with the slant portion to the state in contact with the longitudinally extending portion, the state of exposing the emission window is maintained to enable the cleaning tool to clean the exposed window.

10. A cleaning tool for cleaning the laser exposure device as defined in claim 2, which is provided with a protrusion being in contact with the rib on the leading end of the cleaning tool.

11. A cleaning tool for cleaning the laser exposure device as defined in claim 3, which is provided with a protrusion being in contact with the rib on the leading end of the cleaning tool.

12. An image forming apparatus which comprises the laser exposure device as defined in claim 2 and a photoreceptor, forms an image by forming a latent image on the photoreceptor using the laser exposure device and developing the latent image.

13. An image forming apparatus which comprises the laser exposure device as defined in claim 3 and a photoreceptor, forms an image by forming a latent image on the photoreceptor using the laser exposure device and developing the latent image.

* * * * *